United States Patent
Harrick et al.

(10) Patent No.: US 10,537,095 B2
(45) Date of Patent: Jan. 21, 2020

(54) SYSTEM AND METHOD FOR USING AN IMPACT-ACTIVATED DEVICE FOR REPELLING SHARKS FROM MARINE GEOPHYSICAL SURVEY EQUIPMENT

(75) Inventors: Bruce William Harrick, Cypress, TX (US); Andre Stenzel, Sugar Land, TX (US)

(73) Assignee: PGS Geophysical AS, Oslo (NO)

( * ) Notice: Subject to any disclaimer, the term of this patent is extended or adjusted under 35 U.S.C. 154(b) by 1258 days.

(21) Appl. No.: 13/273,707

(22) Filed: Oct. 14, 2011

(65) Prior Publication Data
US 2013/0094332 A1   Apr. 18, 2013

(51) Int. Cl.
*A01K 79/00*   (2006.01)
*A01K 79/02*   (2006.01)

(52) U.S. Cl.
CPC .................................. *A01K 79/02* (2013.01)

(58) Field of Classification Search
USPC .......................................................... 367/139
See application file for complete search history.

(56) References Cited

U.S. PATENT DOCUMENTS

| | | | |
|---|---|---|---|
| 3,683,280 A | 8/1972 | Holt | |
| 3,822,403 A | 7/1974 | Coleman et al. | |
| 4,211,980 A | 7/1980 | Stowell | |
| 4,298,840 A | 11/1981 | Bischoff et al. | |
| 4,575,680 A | 3/1986 | Gold | |
| 6,285,206 B1 | 9/2001 | Higashide | |
| 6,350,085 B1 | 2/2002 | Bath et al. | |
| 7,142,481 B1 | 11/2006 | Metzbower et al. | |
| 2003/0149459 A1* | 8/2003 | Von Arx et al. | ................. 607/60 |
| 2003/0182040 A1* | 9/2003 | Davidson | ............. A41D 13/018 701/45 |
| 2005/0197686 A1 | 9/2005 | Vlad | |
| 2007/0256623 A1 | 11/2007 | Stroud | |
| 2008/0192570 A1 | 8/2008 | Tenghamn et al. | |
| 2008/0211668 A1* | 9/2008 | Dixon et al. | ................... 340/541 |
| 2009/0038205 A1 | 2/2009 | Stroud | |
| 2010/0212927 A1 | 8/2010 | Harrick | |

(Continued)

FOREIGN PATENT DOCUMENTS

EP     1027618 B1    11/2004
JP   P 2005-34433 A   2/2002

(Continued)

OTHER PUBLICATIONS

"Kinder, Gentler Shark Deterrents" available at http://www.elasmo-research.org/education/white_shark/deterrents.htm, printed from the Internet on Jul. 27, 2011.

(Continued)

*Primary Examiner* — James R Hulka (57) ABSTRACT

Disclosed are methods and systems for using an impact-activated device for repelling sharks from marine geophysical survey equipment. An embodiment discloses a marine geophysical survey system, comprising: marine geophysical survey equipment configured to be located in a body of water when in operation; and an impact-activated device coupled to the marine geophysical equipment, wherein the impact-activated device comprises a circuit configured to release a shark repellent in response to a pre-determined impact on the impact-activated device.

25 Claims, 6 Drawing Sheets

(56) References Cited

U.S. PATENT DOCUMENTS

| | | | |
|---|---|---|---|
| 2010/0224405 A1 | 9/2010 | Borresen et al. | |
| 2010/0278011 A1 | 11/2010 | Harrick | |
| 2011/0290190 A1* | 12/2011 | Becker | 119/220 |

FOREIGN PATENT DOCUMENTS

| | | |
|---|---|---|
| WO | 9915913 A1 | 4/1999 |
| WO | 03011025 | 2/2003 |
| WO | 03011025 A1 | 2/2003 |
| WO | 2006099131 A2 | 9/2006 |
| WO | 2008008127 A2 | 1/2008 |

OTHER PUBLICATIONS

"Shark Repellent Deemed a Breakthrough," USA today, Jul. 31, 2004, available at http://www.usatoday.com/news/science/2004-07-31-shark-repel_x.htm.

"New Shark Repellent Uses Chemical Signals" by Brian Handwerk, National Geographic, Jul. 29, 2004, available at http://news.nationalgeographic.com/news/2004/07/0729_040729_sharkrepellent.html.

"How It Works: When the Shark Doesn't Bite" by Jeffrey Selingo, The New York Times, Jun. 13, 2002, available at http://www.nytimes.com/2002/06/13/technology/how-it-works-when-the-shark-doesn-t-bite.html.

"SharkShield 'proven protection'" available at http://www.sharkshield.com, printed from the Internet on Sep. 29, 2011.

Shelley Dawicki, Can Certain Metals Repel Sharks from Fishing Gear, Reducing Bycatch Could Save Millions of Animals, Reduce Fishing Costs, Science Sportlight, Apr. 2, 2008, Woods Hole, Massachusettes, USA.

Steve Kaimmer and Allan W. Stoner, Field Investigation of Rare-Earth Metal as a Deterrent to Spiny Dogfish in the Pacific Halibut Fishery, www.elsevier.com/locate/fisheries, Jun. 26, 2008, Seattle, Washington, USA.

Joanne Kimberlin, Shark Repellent is a Matter of Life and Death—for Sharks, HamptonRoads.com, PilotOnline.com, Aug. 2, 2008, Wachapreague, Virginia, USA.

Allan W. Stoner and Stephen M. Kaimmer, Reducing Elasmobranch Bycatch: Laboratory Investigation of Rare Earth Metal and Magnetic Deterrents with Spiny Dogfish and Pacific Halibut, Fisheries Research. www.elsevier.com/locate/fishres, Jan. 18, 2008, Newport, Oregon, USA, Seattle, Washington, USA.

Howell, Steven, Patent Examination Report No. 1, dated Oct. 28, 2013, IP Australia, Australian Government, Australia.

Office Action dated Nov. 6, 2018 from Brazilian Patent Application No. BR122018016508-1.

* cited by examiner

SYSTEM AND METHOD FOR USING AN IMPACT-ACTIVATED DEVICE FOR REPELLING SHARKS FROM MARINE GEOPHYSICAL SURVEY EQUIPMENT

BACKGROUND

The present invention relates generally to the field of marine geophysical surveying. More particularly, in one or more embodiments, this invention relates to methods and systems for using an impact-activated device for repelling sharks from marine geophysical survey equipment.

Certain types of marine geophysical surveying, such as seismic or electromagnetic surveying, include towing an energy source at a selected depth in a body of water. One or more geophysical sensor streamers also may be towed in the water at selected depths. The streamers are essentially long cables having geophysical sensors disposed thereon at spaced apart locations. The energy source and streamers may be positioned in the water by attached equipment, such as deflectors and inline position control devices. Actuation of the energy source emits an energy field into the body of water. The energy field interacts with the rock formations below the water bottom. Energy that interacts with interfaces, generally at the boundaries between layers of rock formations, is returned toward the surface and is detected by sensors on the one or more streamers. The detected energy is used to infer certain properties of the subsurface rock, such as structure, mineral composition and fluid content, thereby providing information useful in the recovery of hydrocarbons. Some types of marine geophysical surveying utilize ocean bottom cables, arrays, and/or nodes for locating the geophysical sensors in the water.

One problem that has been encountered in marine geophysical surveying is damage caused by sharks biting the marine geophysical survey equipment. While shark-repelling techniques ranging from semio-chemicals and surfactants to electrical have been used to drive sharks from an area, these techniques have been mainly used to repel sharks from divers. One current electrical device designed to repel sharks from divers is SharkShield™ shark deterrent system, commercially available from Shark Shield Pty Ltd of Brompton, South Australia. Because this system emits high-voltage pulses continuously into the water, its battery life is limited to about one hour, making it unsuitable for protection of towed equipment in a geophysical survey.

Accordingly, there is a need for methods and systems for protection of equipment in marine geophysical surveys from shark bites.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine geophysical surveying. More particularly, in one or more embodiments, this invention relates to methods and systems for using an impact-activated device for repelling sharks from towed geophysical survey equipment.

One of the many potential advantages of the systems and methods of the present invention, only some of which are disclosed herein, is that sharks may be repelled from marine geophysical survey equipment, such as towed streamers, etc. For example, it is believed that embodiments of an impact-activated device can be used to release a shark repellent in response to an impact that repels sharks from equipment in a geophysical survey system, such as towed streamers and the equipment attached thereto. In the case of brush-and-bump tactics from the shark, embodiments of the impact-activated device should release the repellent prior to an actual bite, thus deterring the shark from further investigation and reducing or possibly even eliminating damage from the shark. In the case of hit-and-run tactics from the shark, embodiments of the impact activated device should release the repellent after the impact from the first bite, thus potentially avoiding damage caused by additional bites. Because the impact-activated device is in stand-by and only operates in response to an impact, operation of the impact-activated device can be sustained with a relatively small battery, in accordance with present embodiments.

Figure 1:
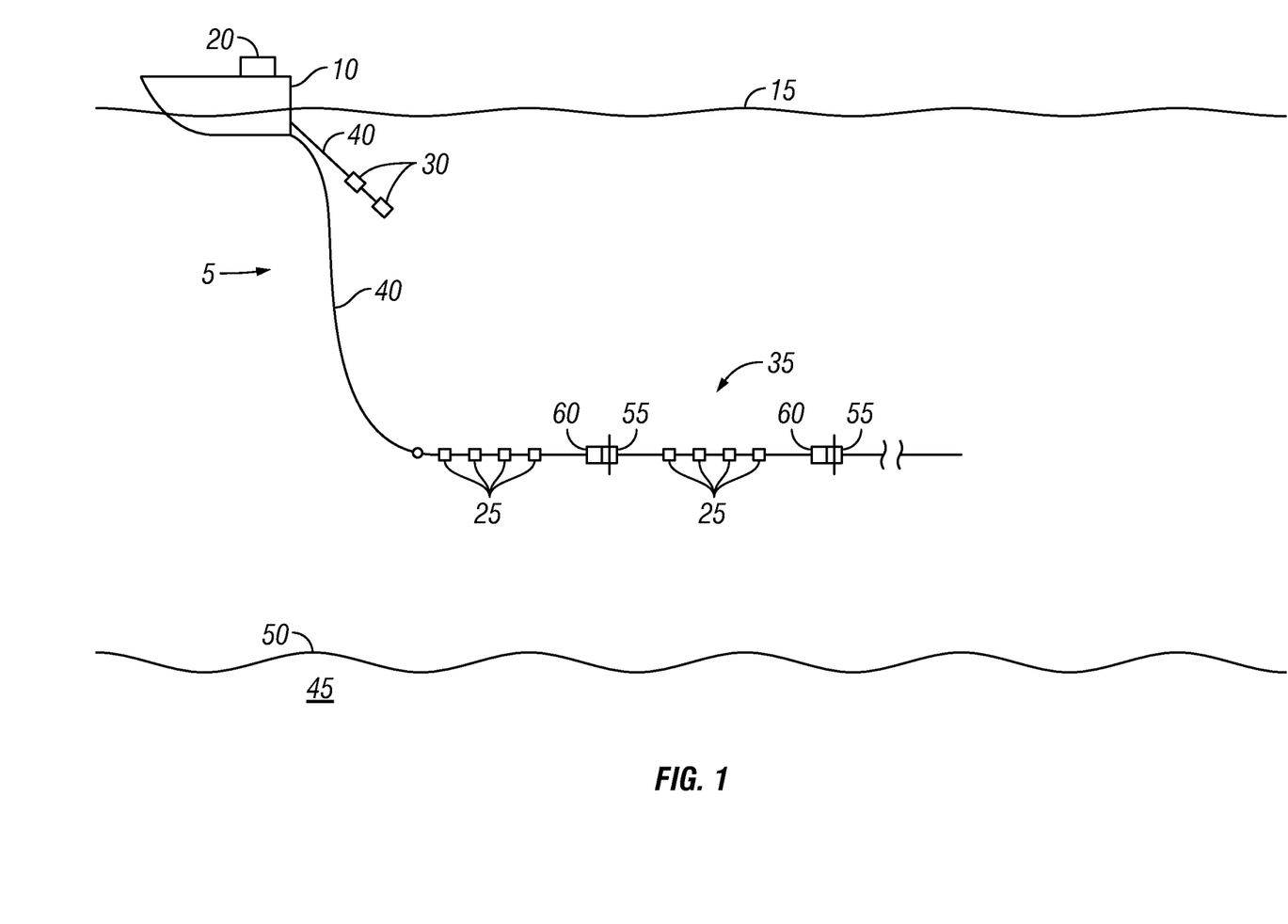
FIG. 1 is a schematic side view of a marine geophysical survey system comprising an impact-activated device in accordance with embodiments of the present invention.

FIG. 1 illustrates a marine geophysical survey system 5 in accordance with embodiments of the present invention. In the illustrated embodiment, the system 5 may include a survey vessel 10 that moves along the surface of a body of water 15, such as a lake or ocean. The survey vessel 10 includes thereon equipment, shown generally at 20 and collectively referred to herein as a "recording system." The recording system 20 may include devices (none shown separately) for determining geodetic position of the vessel (e.g., a global positioning system satellite receiver signal), detecting and making a time indexed record of signals generated by each of geophysical sensors 25 (explained further below), and actuating one or more energy sources 30 (explained further below) at selected times.

As illustrated, the survey vessel 10 tows the energy sources 30 and a streamer 35 in accordance with embodiments of the present invention. Although only two energy sources 30 and a single streamer 35 are shown, this is for illustrative purposes only. It should be understood that the survey system 5 may include more energy source 20 and streamers 35. For example, in some embodiments, as many as eight or more laterally spaced apart streamers 35 may be towed by the survey vessel 10, while in other embodiments, up to 26 laterally spaced apart streamers 35 may be towed by the survey vessel 10. The energy sources 30 and streamer 35 may be coupled to the survey vessel 10 by cables 40. The cables 40 further may be coupled to devices (not shown), such as deflectors, for spreading apart two or more streamers 35. The energy sources 30 may be any selectively actuable sources suitable for subsurface geophysical surveying, including without limitation seismic air guns, water guns, vibrators or arrays of such devices, or one or more electromagnetic field transmitters. The energy sources 30 may be towed in any suitable pattern for geophysical surveying, including in a parallel or orthogonal pattern. As illustrated, the energy sources 30 may be towed through the water 15 at different depths with respect to one another.

The streamer 35 may be formed, for example, by coupling a plurality of streamer segments end-to-end as explained in U.S. Pat. No. 7,142,481, the disclosure of which is incorporated herein by reference. As illustrated, the geophysical sensors 25 may be disposed on the streamer 35 at spaced apart locations. The geophysical sensors 25 may be, without limitation, seismic sensors such as geophones, hydrophones, or accelerometers, or electromagnetic field sensors, such as electrodes or magnetometers. The geophysical sensors 25 may generate response signals, such as electrical or optical signals, in response to detecting energy emitted from the energy sources 30 after the energy has interacted with rock formations 45 below the water floor 50. In the illustrated embodiment, the streamer 35 further includes position control devices 55 for positioning the streamer 35 in the water. The position control devices 55 may be any number of devices suitable for positioning the streamer 35 in the horizontal plane, the vertical plane, and/or both the horizontal and vertical planes, including "birds" having variable-incidence wings. One example of a position control device 55 is described in U.S. Patent Publication No. 2008/0192570, the disclosure of which is incorporated herein by reference. While not illustrated, additional equipment may be coupled to the streamer, including, for example, sensors of various types, such as depth sensors. Also not illustrated, some embodiments may utilize ocean bottom cables, arrays, and/or nodes either in addition to or instead of streamers for the purpose of locating the geophysical sensors in the water.

As illustrated, the streamer 35 further may include impact-activated devices 60 coupled to the streamer 35. In the illustrated embodiment, the impact-activated device 60 is coupled to the streamer 35 adjacent to a position control device 55. In some embodiments, the impact-activated device 60 may located within about 2 feet of the position control device 55. While FIG. 1 illustrates attachment of the impact-activated devices 60 to the streamer 35, it should be understood that one or more of the impact-activated devices 60 may be coupled, for example, to the position control device 55 or other suitable equipment. In general, any type of equipment that is located in the water 15 and is vulnerable to shark bite is considered appropriate for attachment of one or more of the impact-activated devices 60. Moreover, equipment that is towed through the water 15 may be especially vulnerable to shark bite due to the biological responses sharks may have to movement. Equipment emitting certain electromagnetic frequencies may also trigger a heightened response from sharks. One of ordinary skill in the art with the benefit of this disclosure would be aware of the nature and type of equipment which would benefit from impact-activated devices 60. In some embodiments, the impact-activated devices 60 may be coupled to the position control devices 55, as will be described in more detail below with respect to FIG. 3. In some embodiments, the impact-activated devices 60 may be a component of one or more of the position control devices 55. In some embodiments, the impact-activated devices 60 may be integrated into the streamer 35. For example, the impact-activated devices 60 may each be configured to be coupled between streamer segments. In other embodiments (not illustrated), the impact-activated devices 60 may be coupled to or integrated into other types of marine geophysical survey equipment which may be vulnerable to shark bite.

Although the following discussion applies only to operation of a single one of the impact-activated devices 60, it should be understood that it also equally applies to the other impact-activated devices 60, as the impact-activated devices 60 may be substantially identical in embodiments of the present invention. In accordance with present embodiments, the impact-activated device 60 may be configured to activate and release a shark repellent in response to a pre-determined impact. The shark repellent released by the impact-activated device 60 may be any of a variety of different shark repellents suitable for repelling sharks. Non-limiting examples of shark repellents that may be used in accordance with embodiments of the present invention include electrical repellents (e.g., an electrical discharge), gas repellents (e.g., discharge of a high pressure gas, such as air), magnetic repellents (e.g., generation of a magnetic field), and chemical repellents (e.g., release of a chemical, such as a semiochemical). In some embodiments, the impact-activated device 60 may activate when the impact on the impact-activated device 60 reaches or exceeds a pre-determined value. In accordance with embodiments, the impact-activated device 60 can be set for activation at a value as low as necessary so that the impact-activated device 60 would not activate from normal human handling. In some embodiments, the impact-activated device 60 may activate when a pre-determined g-force is reached or exceeded. For example, the shark repellent may be released when an impact equal to or exceeding 2 Gs occurs, alternatively, equal to or exceeding 5 Gs, alternatively, equal to or exceeding 7 Gs, or alternatively, equal to or exceeding 10 Gs.

Figure 2:
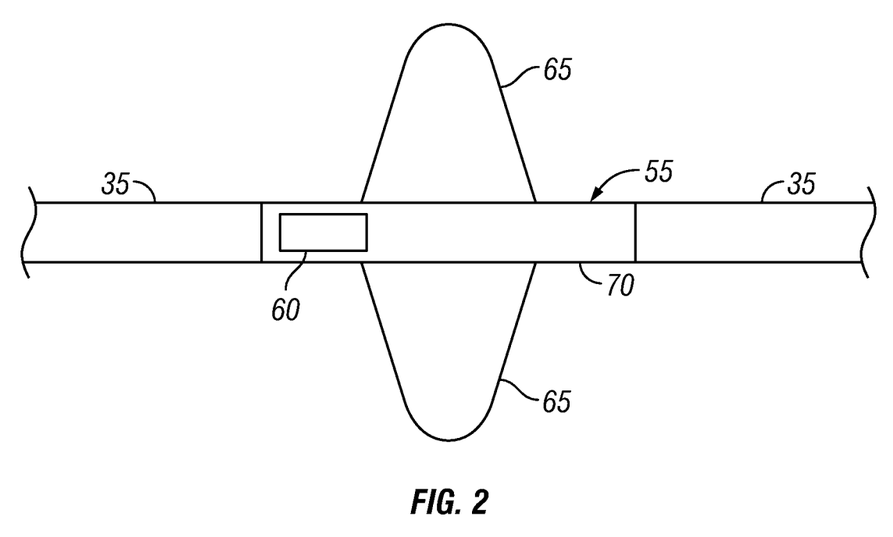
FIG. 2 is a schematic top view of geophysical survey equipment comprising an impact-activated device attached to the equipment in accordance with embodiments of the present invention.

Referring now to FIG. 2, attachment of an impact-activated device 60 to a position control device 55 is illustrated in accordance with embodiments of the present invention. In the illustrated embodiment, the position control device 55 is coupled to the streamer 35. As illustrated, the position control device 55 may further include wings 65 extending from a main body 70 thereof. In some embodiments, the wings 65 may be variable-incidence wings. Any of a variety of different techniques may be used to couple the impact-activated device 60 to the position control device 55, including fasteners, such as hook-and-loop fasteners (e.g., Velcro® straps) and clip fasteners, among others. It should be understood that the configuration shown on FIG. 2 is for illustrative purposes only, and the impact-activated device 60 can be attached in any appropriate manner to any appropriate portion of the position control device 55 or other towed equipment.

Figure 3:
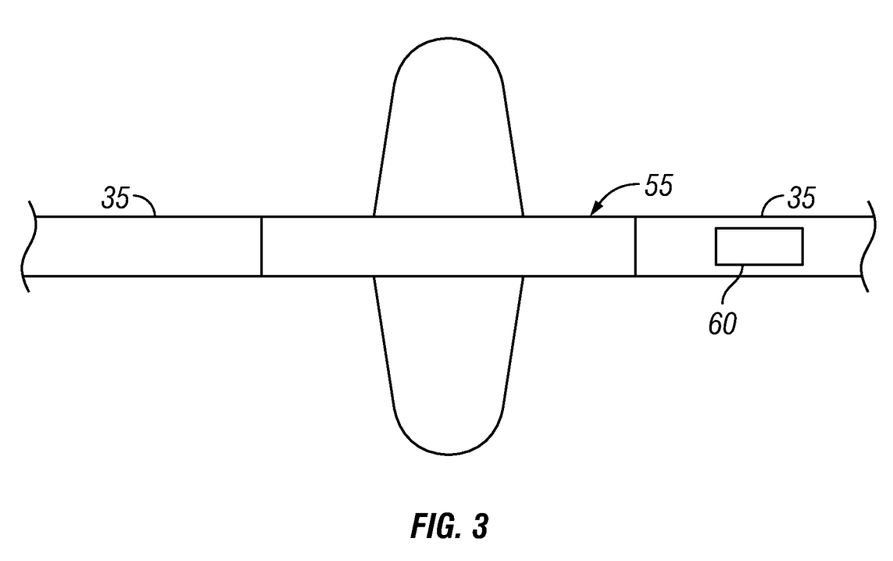
FIG. 3 is a schematic top view of geophysical survey equipment comprising an impact-activated device attached to the streamer in accordance with embodiments of the present invention.

Referring now to FIG. 3, attachment of an impact-activated device 60 to a streamer 35 is illustrated in accordance with embodiments of the invention. In the illustrated embodiment, the impact-activated device 60 is attached to the streamer 35 in close proximity to the position control device 55. For example. the impact-activated device 60 may be attached to the streamer 35 within about 2 feet of the position control device 55. Any of variety of different techniques may be used to couple the impact-activated device 60 to the streamer 35, including fasteners, such as hook-and-loop fasteners (e.g., Velcro® straps) and clip fasteners, among others. It should be understood that the configuration shown on FIG. 3 is for illustrative purposes only, and the impact-activated device 60 can be attached in any appropriate manner to any appropriate portion of the streamer 35 or other towed equipment.

Figure 4:
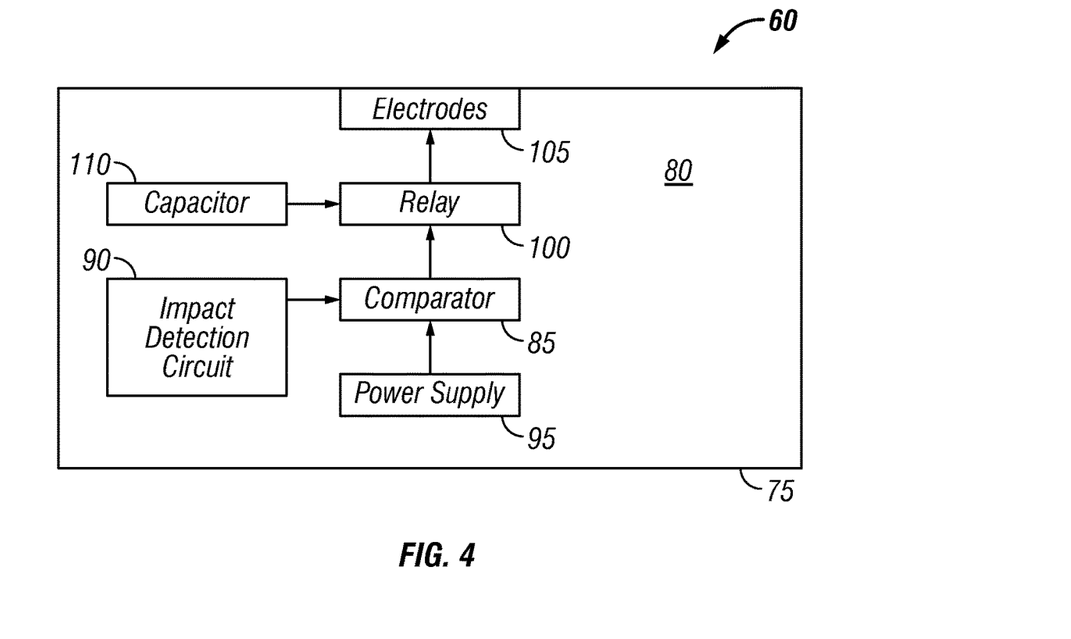
FIG. 4 is a schematic view of an impact-activated device in accordance with embodiments of the present invention.

FIG. 4 is a schematic illustration of an impact-activated device 60 in accordance with embodiments of the present invention. As illustrated, the impact-activated device 60 includes a housing 75 that can be, for example, pressure sealed and high strength. In general, the material used for the housing 75 should be able to withstand hydrostatic pressure at the maximum operating depth of the streamer 35. The housing 75 may be generally cylindrical or any other shape suitable for attachment to or incorporation in towed equipment in accordance with embodiments of the present invention. The housing 75 may define a sealed interior chamber 80 that can be, for example, generally at atmospheric pressure. A voltage comparator 85 mounted in the interior chamber 80 is responsive to the output of an impact-sensing circuit 90 and compares this output with a reference voltage from a power source 95, which may be a battery or other suitable power source, for example. By way of example, the power source 95 may be a 3-volt to 24-volt battery.

As illustrated, the impact-sensing circuit 90 may include any of a variety of different devices for sensing impact and outputting a voltage, including, for example, accelerometers and geophones, among others. Non-limiting examples of accelerometers include multi-component and single-component accelerometers. When the output voltage from the impact-sensing circuit 90 exceeds the reference voltage, the voltage comparator 85 responds to the change and activates circuitry, which may be a discharge of a charged capacitor (e.g., capacitor 110) or to switch on a pulse-generation circuit. In the case of a capacitor discharge, for example, a relay 100 receives the output from the voltage comparator 85 and interfaces with one or more electrodes 105. The electrodes 105 are in contact with the water 15 (e.g., FIG. 1). The output from the voltage comparator 85 can actuate the relay 100 connecting the electrodes 105 to a voltage source, illustrated by capacitor 110 on FIG. 4, thus generating an electrical discharge from the electrodes 105. The impact-sensing circuit 90 may be configured so that the capacitor 110 is charged by the power source 95. In accordance with present embodiments, the electrodes 105 can be configured to generate a pulse that has an amplitude equal to the voltage supplied by the power source 95. In some embodiments, this pulse may be the discharge of the capacitor 110, which has been charged by the power source 95, for example. In an alternative embodiment (not illustrated), the voltage source coupled to the electrodes 105 may be, for example, a pulse-generation circuit. The pulse-generation circuit may include, for example, a pulse generator having programmed sequences stored in a memory chip and output through conditioning circuitry that sets the voltage amplitude at a predetermined level having repellent effect while sustaining battery life. In one embodiment, the pulse-generation circuit could be continuously running to provide a first barrier against attack with the impact-activated device 60 providing a hack-up if a shark breaks through the first barrier.

Without being limited by theory, it is believed that the electrical discharge from the electrodes 105 into the water 15 (e.g., FIG. 1) can be used to repel sharks. For example, the impact-sensing circuit 90 may sense a bump from a shark, thus releasing the electrical discharge to prevent damage from the shark. Alternatively, the impact-sensing circuit 90 may sense an actual attack from a shark, thus releasing the electrical discharge to prevent damage from further shark attacks. In some embodiments, the impact-activated device 60 may configured to release a pre-set voltage into the water 15 (e.g., FIG. 1) in response to the impact. It has been observed that voltages as low as 300 millivolts can repel sharks when applied to the electrodes 105. The electrical field strength discharged into the water associated with the voltage is dependent upon electrode separation. It is believed that a wider electrode separation will give the shark an impression of a larger creature, producing a fleet response from the shark upon discharge into the water. Thus, the impact-sensing circuit 90 can be configured to have an electrode separation and voltage discharge sufficient to repel sharks.

Those of ordinary skill in the art will understand that, for simplicity, only some of the components of impact-activated device 60 are illustrated on FIG. 4. It should be further understood that the configuration shown on FIG. 4 for releasing an electrical discharge is for illustrative purposes only, and the impact-activated device 60 can be used in any appropriate matter to release any suitable shark repellent in response to an impact.

Figure 5:
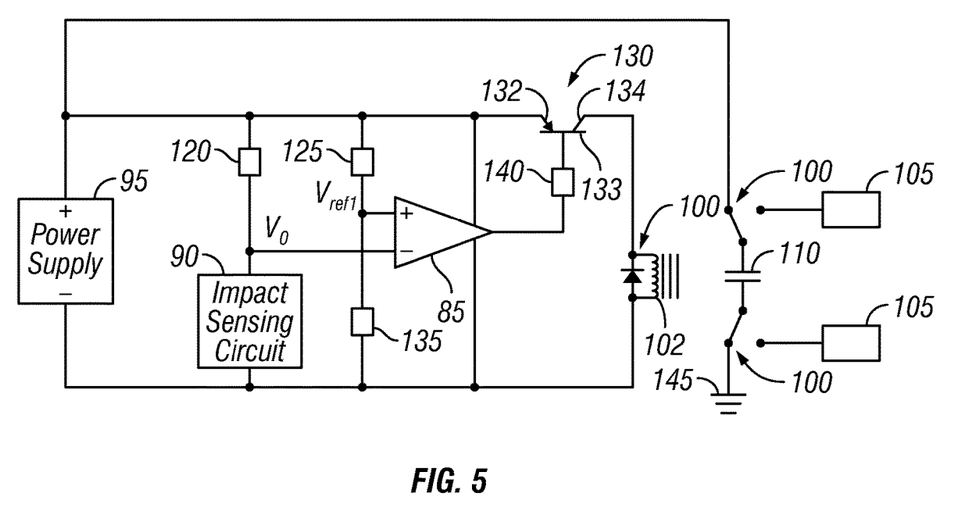
FIGS. 5 and 6 are circuit diagrams for an impact-threshold-detector circuit in accordance with embodiments of the present invention.
Figure 6:
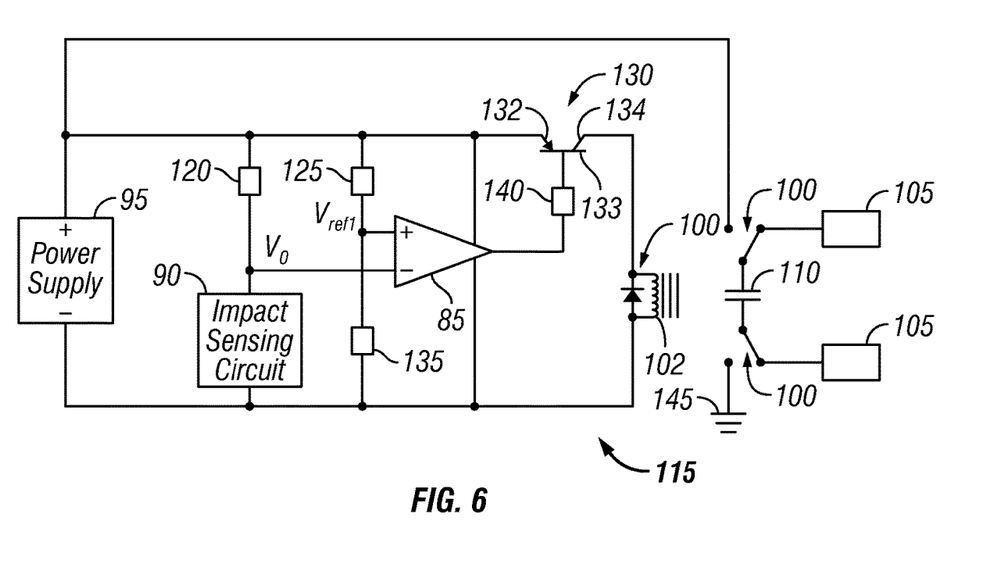

FIGS. 5 and 6 illustrate the circuitry of the impact-activated device 60 in accordance with embodiments of the present invention. The embodiments illustrated on FIGS. 5 and 6 include the impact-sensing circuit 90 incorporated into an impact-threshold-detector circuit 115. The impact-threshold-detector-circuit 115 comprises power supply 95, which may be a battery, for example. In some embodiments, the power supply 95 may be a 3-volt to 24-volt battery, for example, a 3-volt battery or a 9-volt battery. The positive terminal of the power supply 95 is connected to the negative terminal of the voltage comparator 85 thru first resistor 120. The positive terminal of the power supply 95 is connected to the negative terminal of the voltage comparator 85 through second resistor 125. The positive terminal of the power supply 95 is connected to the emitter 132 of transistor 130. The negative terminal of the power supply 95 is connected to the positive terminal of the voltage comparator 85 thru third resistor 135. The negative terminal of the power supply 95 is connected to the negative terminal of the voltage comparator 85 thru the impact-sensing circuit 90. The output of the voltage comparator 85 is coupled to the base 133 of the transistor 130 through fourth resistor 140.

In the illustrated embodiment, the impact-threshold-detector circuit 115 further comprises relay 100. The relay 100 is coupled to the collector 134 of the transistor 130 and the negative terminal of the power supply 95. As illustrated, the coil 102 of the relay 100 receives power from the power supply 95, the flow of which is controlled by transistor 130 in response to the output of the voltage comparator 85. When the output voltage $V_o$ generated by the impact-sensing circuit 90 is less than the reference voltage $V_{ref1}$ fed to the negative terminal of the voltage comparator 85, the output from the voltage comparator 85 is a high voltage. Outputting a high voltage level from the voltage comparator 85, switches off the transistor 130, thus cutting off the flow of current through the relay 100. As illustrated by FIG. 5, when the relay 100 is de-activated, the relay 100 opens to disconnect the electrodes 105 and the capacitor 110, while connecting the capacitor 110 to ground 145 and the positive terminal of power supply 95. Second resistor 125 and third resistor 130 may be selected such that, when the output voltage $V_o$ generated by the impact-sensing circuit 90 meets or exceeds the reference voltage $V_{ref1}$ fed to the positive terminal of the voltage comparator 85, the output from the voltage comparator 85 is driven to zero. Driving the output from the voltage comparator 85 to zero switches on the transistor 130, thus facilitating the flow of current through the relay 100. When the relay 100 is activated, the relay 100 closes connecting the electrodes 105 and the capacitor 110, thus generating an electrical discharge from the electrodes 105. While the preceding description of FIGS. 5 and 6 is for a specific embodiment of an impact-threshold-detector circuit 115, it should be understand that the configuration shown is for illustrative purposes only, and the impact-threshold-detector circuit 115 can be configured in any appropriate manner with any appropriate devices for generating the electrical discharge in response to an impact.

Figure 7:
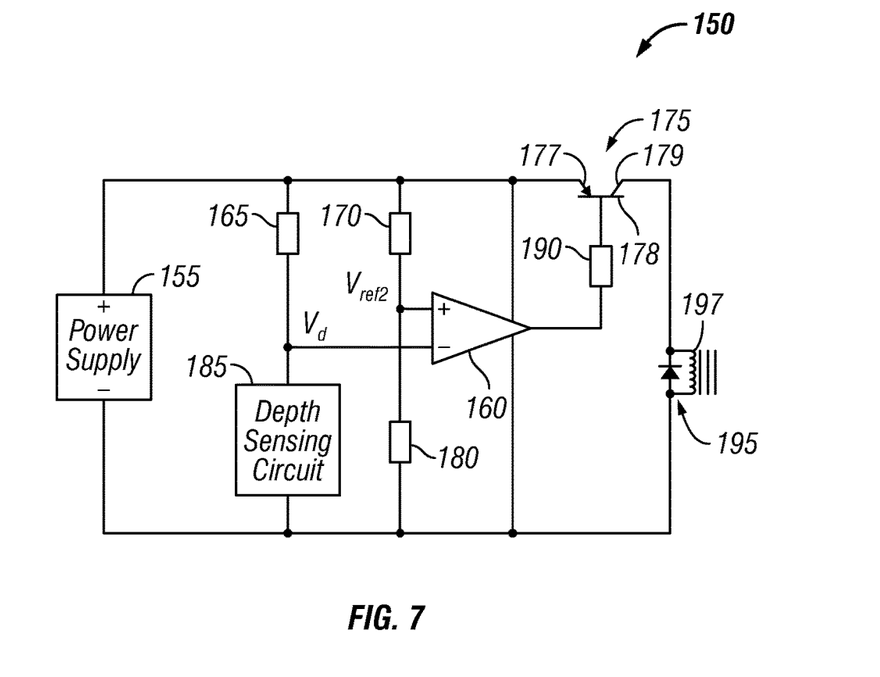
FIG. 7 is a circuit diagram for a depth-inhibitor circuit in accordance with embodiments of the present invention.

FIG. 7 illustrates a depth-inhibitor circuit 150 in accordance with embodiments of the present invention. The depth-inhibitor circuit 150 may be configured to turn on the impact-threshold-detection-circuit 115 (e.g., FIG. 8) at a pre-determined depth so that the impact-activated device 60 (e.g., FIG. 4) will not operate if above the surface of the water 15 (e.g., FIG. 1). In other words, the impact-activated device 60 may need to be submerged to operate in accordance with certain embodiments. This may enhance, for example, safety of crew members handling the impact-activated device 60. In some embodiments, the depth-inhibitor circuit 150 may turn on the impact-threshold-detector circuit 115 when a pre-determined depth is reached or exceeded. For example, the impact-threshold-detector circuit 115 may be turned on when a depth equal to or exceeding 5 feet is reached, and alternatively equal to or exceeding 10 feet.

As illustrated by FIG. 7, the depth-inhibitor circuit 150 comprises second power supply 155, which may be a battery, for example. In some embodiments (not illustrated), the depth-inhibitor circuit 150 may be supplied by the same power supply as the impact-threshold-detection-circuit 115. In some embodiments, the second power supply 155 may be a 3-volt or 9-volt battery. The positive terminal of the second power supply 155 is connected to the negative terminal of the second voltage comparator 160 thru fifth resistor 165. The positive terminal of the second power supply 155 is connected to the positive terminal of the second voltage comparator 160 through sixth resistor 170. The positive terminal of the second power supply 155 is connected to the emitter 177 of second transistor 175. The negative terminal of the second power supply 155 is connected to the positive terminal of the second voltage comparator 160 thru seventh resistor 180. The negative terminal of the second power supply 155 is connected to the negative terminal of the second voltage comparator 160 thru the depth-sensing circuit 185, which comprise a depth transducer, for example. The output of the second voltage comparator 160 is coupled to the base 178 of the second transistor 175 through eighth resistor 190.

In the illustrated embodiment, the depth-inhibiting circuit 150 further comprises second relay 195. The second relay 195 is coupled to the collector 179 of the second transistor 175 and the negative terminal of the second power supply 155. As illustrated, the coil 197 of the second relay 195 receives power from the second power supply 155, the flow of which is controlled by second transistor 175 in response to the output of the second voltage comparator 160. When the output voltage $V_d$ generated by the depth-sensing circuit 185 is less than the reference voltage $V_{ref2}$ fed to the positive terminal of the second voltage comparator 160, the output from the second voltage comparator 160 is a high voltage. Outputting a high voltage from the second voltage comparator 160, switches off the second transistor 175, thus cutting off the flow of current through the second relay 195 and opening the second relay 195. Sixth resistor 170 and seventh resistor 180 may be selected such that, when the voltage $V_d$ generated by the depth-sensing circuit 185 meets or exceeds the reference voltage $V_{ref2}$ fed to the positive terminal of the second voltage comparator 160, the output from the second voltage comparator 160 is driven to zero. Driving the output from the second voltage comparator 160 to zero switches on the second transistor 175, thus facilitating the flow of current through the second relay 195 and closing the second relay 195. While the preceding description of FIG. 7 is for a specific embodiment of the depth-inhibiting circuit 150, it should be understand that the configuration shown is for illustrative purposes only, and the depth-inhibiting circuit 150 can be configured in any appropriate manner with any appropriate devices for turning on the impact-threshold-detector circuit 115 at a predetermined depth.

Figure 8:
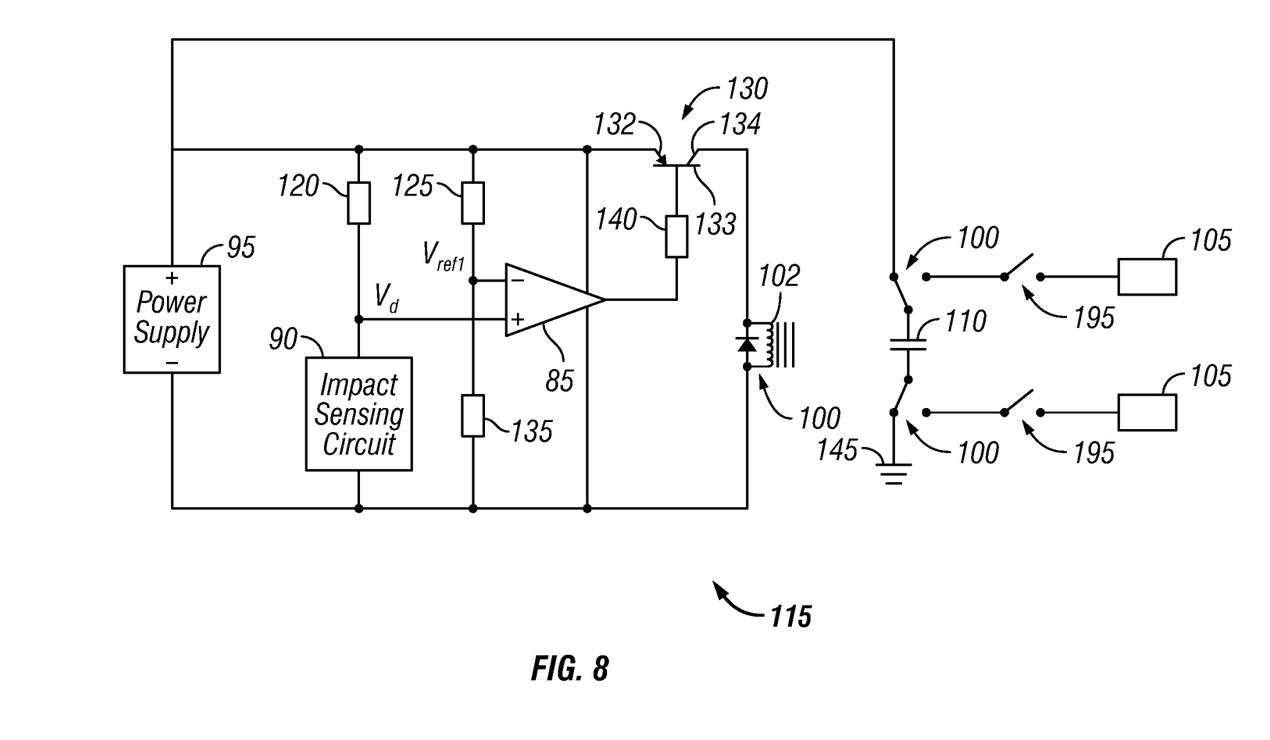
FIG. 8 is a circuit diagram for an impact-threshold-detector circuit incorporating a depth-inhibitor circuit in accordance with embodiments of the present invention.

FIG. 8 illustrates an impact-threshold-detector circuit 115 incorporating the second relay 195 of the depth-inhibiting circuit 150 of FIG. 7, in accordance with embodiments of the present invention. The impact-threshold-detector circuit 115 is similar to the circuit 115 illustrated on FIGS. 5 and 6 except that the contacts of the second relay 195 are incorporated between the electrodes 105 and the capacitor 110. When the second relay 195 is open, electrodes 105 are disconnected from the capacitor 110 even when the first relay 100 is closed. Accordingly, the electrodes 105 cannot be activated to generate an electrical discharge when the second relay 195 is open. When the second relay 195 is closed, electrodes 105 are connected to the capacitor 110, thus generating an electrical discharge.

Figure 9:
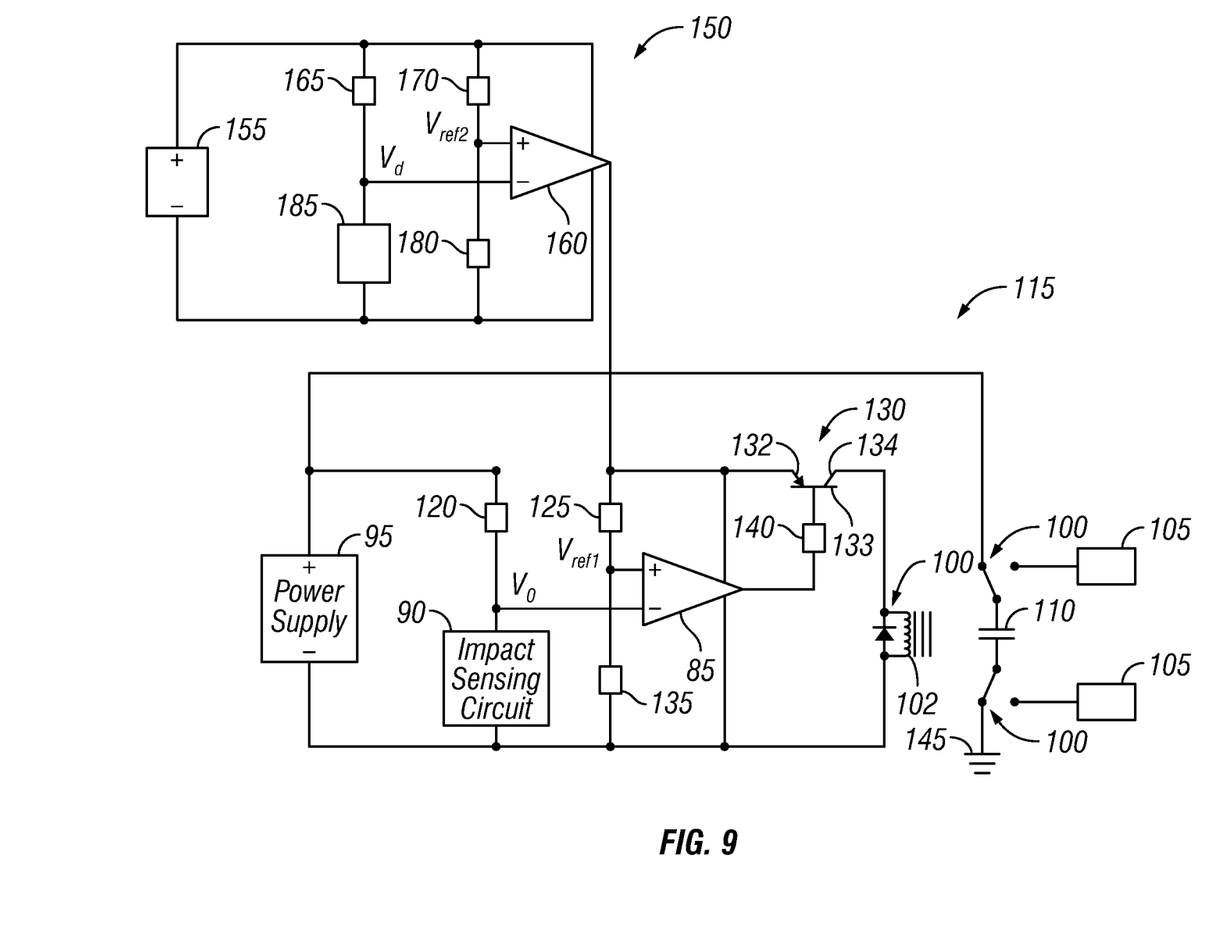
FIG. 9 is a circuit diagram for an impact-threshold-detector circuit incorporating a depth-inhibitor circuit in accordance with alternative embodiments of the present invention.

FIG. 9 illustrates an impact-threshold-detector circuit 115 incorporating a depth-inhibiting circuit 150, in accordance with an alternative embodiment of the present invention. In the illustrated embodiment, the depth-inhibiting circuit 150 is similar to the depth-inhibiting circuit 150 illustrated on FIG. 7, except that the second transistor 175 and the second relay 195 have been removed. In addition, the impact-threshold-detector circuit 115 is similar to the impact-threshold-detector circuit 115 illustrated on FIGS. 5 and 6 except that the output of the second voltage comparator 160 is connected to the negative terminal of the voltage comparator 85 through second resistor 125 with the second resistor 125 disconnected from the positive terminal of the power supply 95. Accordingly, $V_{ref1}$ is fed to the positive terminal of the voltage comparator 85 from the output of second voltage comparator 160. As previously mentioned, the output of the second voltage comparator 160 is a high voltage when the output voltage $V_d$ generated by the depth-sensing circuit 185 is less than the reference voltage $V_{ref2}$ fed to the positive terminal of the second voltage comparator 160, and the output of the second voltage comparator 160 is driven to zero when the voltage $V_d$ generated by the depth-sensing circuit 185 meets or exceeds the reference voltage $V_{ref2}$ fed to the positive terminal of the second voltage comparator 160

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A marine geophysical survey system, comprising:
    marine geophysical survey equipment configured to be located in a body of water when in operation, wherein the marine geophysical survey equipment comprises a streamer; and
    an impact-activated device coupled to the marine geophysical survey equipment, wherein the impact-activated device comprises a circuit configured to release a shark repellent in response to a pre-determined impact on the impact-activated device that is equal to or exceeds a pre-determined g-force.

2. The marine geophysical survey system of claim 1, wherein the shark repellent comprises an electrical discharge.

3. The marine geophysical survey system of claim 2, wherein the circuit comprises:
    an impact-sensing circuit configured to discharge a voltage in response to an impact;
    a voltage comparator configured to compare a reference voltage and the voltage from the impact-sensing circuit, and wherein the voltage comparator has a comparator output with a connect condition when the voltage from the impact-sensing circuit meets or exceeds the reference voltage;
    a voltage source;
    electrodes; and
    a relay configured to couple the voltage source and the electrodes when the comparator output is in the connect condition.

4. The marine geophysical survey system of claim 3, wherein the voltage source comprises a capacitor configured to generate the electric discharge.

5. The marine geophysical survey system of claim 3, wherein the voltage source comprises a pulse-generation circuit configured to generate the electrical discharge.

6. The marine geophysical survey system of claim 3, wherein the impact-sensing circuit comprises an accelerometer.

7. The marine geophysical survey system of claim 3, wherein the marine geophysical survey system further comprises a depth-inhibit circuit configured to supply the reference voltage to a positive terminal of the voltage comparator.

8. The marine geophysical survey system of claim 1, wherein the pre-determined g-force is equal to or exceeds about 2 Gs.

9. The marine geophysical survey system of claim 1, wherein the marine geophysical survey system further comprises a position control device coupled to the streamer, and wherein the impact-activated device is disposed without about 2 feet of the position control device.

10. The marine geophysical survey system of claim 1, wherein the marine geophysical survey system further comprises a position control device coupled to the streamer, and wherein the impact-activated device is located within about 2 feet of the position control device.

11. The marine geophysical survey system of claim 1, wherein the marine geophysical survey system further comprises a position control device coupled to the streamer, and wherein the impact-activated device is mounted on the position control device.

12. The marine geophysical survey system of claim 1, further comprising geophysical sensors disposed on the streamer at spaced apart locations.

13. The marine geophysical survey system of claim 1, further comprising a pulse-generation circuit, wherein the pulse-generation circuit is configured to continuously discharge an electrical discharge.

14. The marine geophysical survey system of claim 1, wherein the impact-activated device further comprises a depth-inhibiting circuit configured to activate the circuit at a pre-determined depth.

15. An impact-activated device for releasing a shark repellent, comprising:
    an impact-sensing circuit; and
    a circuit configured to release a shark repellent in response to a pre-determined impact detected by the impact-sensing circuit, wherein the circuit comprise:
    an impact-sensing circuit configured to discharge a voltage in response to an impact;
    a voltage comparator configured to compare a reference voltage and the voltage from the impact-sensing circuit, and wherein the voltage comparator has a comparator output with a connect condition when the voltage from the image-sensing circuit meets or exceeds the reference voltage;
    a voltage source;
    electrodes; and
    a device configured to couple the voltage source and the electrodes when the comparator output is in the connect condition.

16. The impact-activated device of claim 15, wherein the shark repellent comprises an electrical discharge.

17. The impact-activated device of claim 15, wherein the voltage source comprises a capacitor configured to generate the electric discharge.

18. The impact-activated device of claim 15, wherein the voltage source comprises a pulse-generation circuit configured to generate the electrical discharge.

19. The impact-activated device of claim 15, wherein the impact-sensing circuit comprises an accelerometer.

20. The impact-activated device of claim 15, wherein the circuit further comprises a second relay configured to couple voltage source and the electrodes at a pre-selected depth.

21. The impact-activated device of claim 15, wherein the pre-determined impact is a g-force that is equal to or exceeds about 2 Gs.

22. A method for protecting marine geophysical survey equipment from shark bite, comprising:
    disposing the marine geophysical survey equipment comprising a streamer in a body of water, wherein an impact-activated device is coupled to the marine geophysical survey equipment, wherein the impact-activated device comprises a circuit configured to release a shark repellent in response to a pre-determined impact on the impact-activated device that is equal to or exceeds a pre-determined g-force.

23. The method of claim 22, wherein the shark repellent comprises an electrical discharge.

24. The method of claim 23, further comprising discharging the electrical discharge into the body of water in response to an impact from a shark that is equal to or exceeds a g-force of about 2 Gs.

25. The method of claim 22, further comprising activating the impact-activated device at a pre-selected depth.

* * * * *